(12) United States Patent
Taras et al.

(10) Patent No.: US 7,854,136 B2
(45) Date of Patent: Dec. 21, 2010

(54) AUTOMATED DRIVE FOR FAN AND REFRIGERANT SYSTEM

(75) Inventors: Michael F. Taras, Fayetteville, NY (US); Thomas J. Dobmeier, Phoenix, NY (US); Alexander Lifson, Manlius, NY (US)

(73) Assignee: Carrier Corporation, Farmington, CT (US)

( * ) Notice: Subject to any disclaimer, the term of this patent is extended or adjusted under 35 U.S.C. 154(b) by 1306 days.

(21) Appl. No.: 11/199,712

(22) Filed: Aug. 9, 2005

(65) Prior Publication Data

US 2007/0033957 A1    Feb. 15, 2007

(51) Int. Cl.
*F25D 17/04*    (2006.01)
*F25B 39/04*    (2006.01)
*F16H 59/00*    (2006.01)

(52) U.S. Cl. .............................. 62/186; 62/183; 474/22

(58) Field of Classification Search .................. 62/183, 62/186, 175, 510, 513; 474/18, 16, 22, 21, 474/27, 28, 46
See application file for complete search history.

(56) References Cited

U.S. PATENT DOCUMENTS

| | | | |
|---|---|---|---|
| 2,275,429 A * | 3/1942 | Hallinan ...................... | 474/22 |
| 3,410,405 A | 11/1968 | Marsteller | |
| 3,739,596 A | 6/1973 | Ballard | |
| 4,357,806 A * | 11/1982 | Harris et al. .................. | 62/186 |
| 4,389,853 A * | 6/1983 | Hile .............................. | 62/89 |
| 4,446,704 A | 5/1984 | Yamazaki et al. | |
| 4,573,948 A * | 3/1986 | Thirion de Briel ............ | 474/28 |
| 4,987,881 A * | 1/1991 | Narang ................... | 126/110 R |
| 5,046,326 A | 9/1991 | Havemann et al. | |
| 5,086,626 A | 2/1992 | Iida | |
| 5,144,812 A | 9/1992 | Mills, Jr. et al. | |
| 5,241,817 A | 9/1993 | George, Jr. | |
| 5,245,836 A | 9/1993 | Lorentzen et al. | |
| 5,255,529 A | 10/1993 | Powell et al. | |
| 5,490,394 A | 2/1996 | Marques et al. | |
| 5,568,732 A | 10/1996 | Isshiki et al. | |
| 5,613,369 A | 3/1997 | Sato et al. | |

(Continued)

FOREIGN PATENT DOCUMENTS

EP    0210303    2/1987

(Continued)

OTHER PUBLICATIONS

International Search Report and Written Opinion dated Jan. 29, 2008.

(Continued)

*Primary Examiner*—Chen-Wen Jiang
(74) *Attorney, Agent, or Firm*—Carlson, Gaskey & Olds

(57) ABSTRACT

A refrigerant system is provided with a variable speed drive for at least one of its fluid-moving devices, wherein the variable speed drive is provided by an automated mechanical drive. In the disclosed embodiment, one of the pulleys for driving the fluid-moving device has a variable diameter to vary the speed at which the fluid-moving device is driven. The pulley may include two plates that are biased in one direction by a spring or permanent magnet force, and in an opposed direction by a hydraulic or electro-magnetic force. A control adjusts the amount of hydraulic or electro-magnetic force delivered to the plates to achieve a desired speed for the fluid-moving device.

19 Claims, 3 Drawing Sheets

U.S. PATENT DOCUMENTS

| | | | |
|---|---|---|---|
| 5,657,638 A | 8/1997 | Erdman et al. | |
| 5,694,783 A | 12/1997 | Bartlett | |
| 5,782,101 A | 7/1998 | Dennis | |
| 5,797,276 A | 8/1998 | Howenstine et al. | |
| 6,073,457 A | 6/2000 | Kampf et al. | |
| 6,276,148 B1 * | 8/2001 | Shaw | 62/117 |
| 6,397,610 B1 | 6/2002 | Weng et al. | |
| 6,415,617 B1 | 7/2002 | Seem | |
| 6,478,701 B1 * | 11/2002 | Yasuhara et al. | 474/12 |
| 6,481,231 B2 * | 11/2002 | Vogel et al. | 62/278 |
| 6,560,980 B2 * | 5/2003 | Gustafson et al. | 62/186 |
| 6,571,576 B1 * | 6/2003 | Lifson et al. | 62/513 |
| 6,694,763 B2 | 2/2004 | Howard | |
| 6,968,708 B2 | 11/2005 | Gopalnarayanan et al. | |
| 2001/0054293 A1 | 12/2001 | Gustafson et al. | |
| 2005/0097977 A1 | 5/2005 | Van Cor | |
| 2005/0126193 A1 * | 6/2005 | Lifson et al. | 62/175 |

FOREIGN PATENT DOCUMENTS

| | | |
|---|---|---|
| EP | 0981033 | 2/2000 |
| EP | 1538405 | 6/2005 |
| JP | 62233415 | 10/1987 |

OTHER PUBLICATIONS

International Preliminary Report on Patentability dated Mar. 19, 2009.

European Search Report dated Dec. 11, 2009.

* cited by examiner

AUTOMATED DRIVE FOR FAN AND REFRIGERANT SYSTEM

BACKGROUND OF THE INVENTION

This application relates to a variable speed drive provided for a fluid-moving device such as a fan operated within a refrigerant system, wherein the variable speed is achieved by an automated mechanical control for the fan drive.

Refrigerant systems are utilized in many applications to condition an environment. In particular, air conditioners and heat pumps are employed to cool and/or heat a secondary fluid such as air entering an environment. The cooling or heating load of the environment may vary with ambient conditions, occupancy level, other changes in sensible and latent load demands, and as the temperature and/or humidity set points are adjusted by an occupant of the environment.

It would be desirable to have a variable speed control for fluid-moving devices, such as the fans moving air over indoor and outdoor heat exchangers. As an example, a fan speed change may be desirable when there is a change in the compressor speed or mode of operation. As known, the compressor speed may need to be adjusted to accommodate internal and external thermal load demands. Further, to have an ability to operate in various modes, a refrigerant system may be provided with an economizer cycle, and a compressor may be equipped with an unloading function. When the compressor is run unloaded or economized, it may be desirable to change the fan speed accordingly to maintain operational parameters, such as temperature and humidity, within the environment to be conditioned. Additionally, the fan speed may be required to be adjusted with a change in occupancy level or to maintain desired sensible heat ratios to provide a certain level of comfort for an occupant of the environment. Also, it may be desirable to decrease the fan speed to improve the system efficiency by minimizing fan power draw.

In another example, it may also be desirable to adjust the fan speed in response to changes of ambient conditions or variations in cooling requirements. For instance, to provide safe and reliable refrigerant system operation a condenser fan speed may be increased at high ambient temperatures to reduce discharge pressure (an opposite functionality may be required at low ambient temperatures), or an evaporator fan speed may need to be raised to prevent coil frosting.

In the past, if variable speed fan operation was desired, a variable frequency drive needed to be provided. However, variable speed drives are expensive, and are challenging to integrate with conventional system controls. Also, variable speed drives carry additional efficiency losses and reliability issues for a refrigerant system.

In the past, to vary the fan speed, mechanical drives for the fans have been adjusted manually. As an example, such fans are typically driven by a mechanical pulley, and a mechanic would manually adjust the setting on the pulley to set the fan speed. However, such technology does not change the fan speed on the fly, and has typically been performed only at initial set-up/installation. Thus, this option does not allow a fan speed change in response to constantly changing operating conditions and cooling demands.

Thus, there is a need exists for automated mechanical variable speed drive for air moving devices provided within a refrigerant system.

SUMMARY OF THE INVENTION

In a disclosed embodiment of this invention, a drive for a fan incorporates an automated variable diameter pulley system. In a disclosed embodiment, two plates of a conical shape (two adjustable pulley halves) driven by a belt (or to drive a belt) are movable toward and away from each other to vary the diameter of the contact surface between the belt and the plates. As this diameter varies, the speed at which the fan will be operated will also vary.

In a disclosed embodiment, a hydraulic fluid may be injected into chambers associated with the pulley plates to drive these plates toward and away from each other. A spring biases the plates in opposition to the force exerted hydraulic fluid.

In another embodiment, an electric current may be provided to the electric coil to create an electro-magnetic force to drive the pulley plates toward and away from each other.

In still another embodiment, a permanent magnet may be used to replace the spring.

The present invention may also be utilized in refrigerant systems incorporating an unloader function, an economizer function, and other optional controls and features. The fan speed may be varied dependent upon whether these functions are actuated. Also, a desired fan speed may change based upon the thermal load or system operating conditions, such as the condenser or evaporator refrigerant pressures. A worker in this art would recognize when a fan speed should change. The present invention provides a simple way to change the fan speed.

These and other features of the present invention can be best understood from the following specification and drawings, the following of which is a brief description.

DETAILED DESCRIPTION OF THE PREFERRED EMBODIMENT

Figure 1:
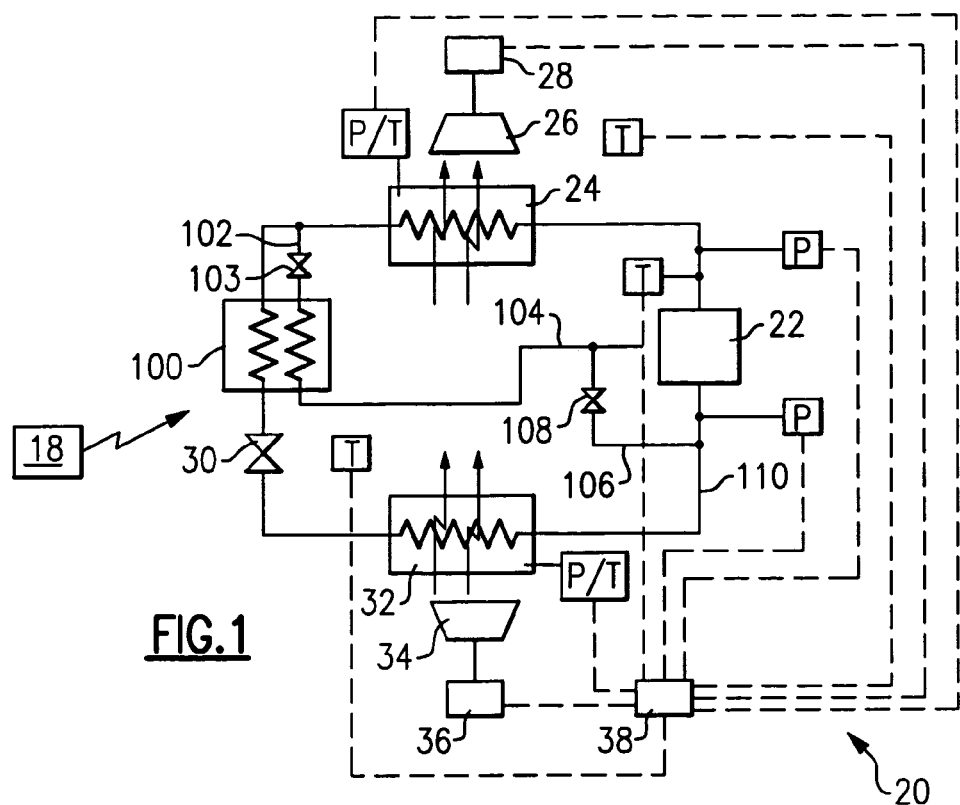
FIG. 1 is a schematic view of a refrigerant system incorporating the present invention.

A refrigerant system 20 is illustrated in FIG. 1 and incorporates a compressor 22 for compressing a refrigerant and delivering it to a downstream condenser or in this case an outdoor heat exchanger 24. A fan 26 blows air over the heat exchanger 24 and is associated with a motor drive 28. Also, an optional economizer circuit is illustrated in FIG. 1. Downstream of the outdoor heat exchanger 24 is an economizer heat exchanger 100. As is known, the refrigerant is tapped through a tap line 102, past an economizer expansion device 103, and exchanges heat with the main flow of refrigerant in the economizer heat exchanger 100. The tapped refrigerant is typically returned as a vapor through an economizer line 104 to an intermediate compression point in the compressor 22.

Downstream of the economizer heat exchanger 100 is a main expansion device 30, and downstream of the main expansion device 30 is an evaporator or in this case an indoor heat exchanger 32. A fan 34 is provided with a motor drive 36 and blows air over the evaporator 32. A system control 38 controls the speed of the fan motor drive 36, as will be explained below. Similar control 38 may also be associated with the fan motor drive 28 (not shown) but in reality it would be used less frequently than the control 38. The controls 38 may communicate to, or be integrated with, a refrigerant system control 18. The system control 38 can also control other components within the refrigerant system 20.

A suction line 110 returns refrigerant to the compressor 22 from the evaporator 32. A bypass line 106 allows at least a portion of partially compressed refrigerant to be selectively bypassed from the compressor 22 back to the suction line 110. An unloader valve 108 opens or closes this bypass line. Of course, the single compressor 22 can be replaced with two compressor stages and the unloader function can bypass refrigerant from a point intermediate the two stages.

Figure 2A:
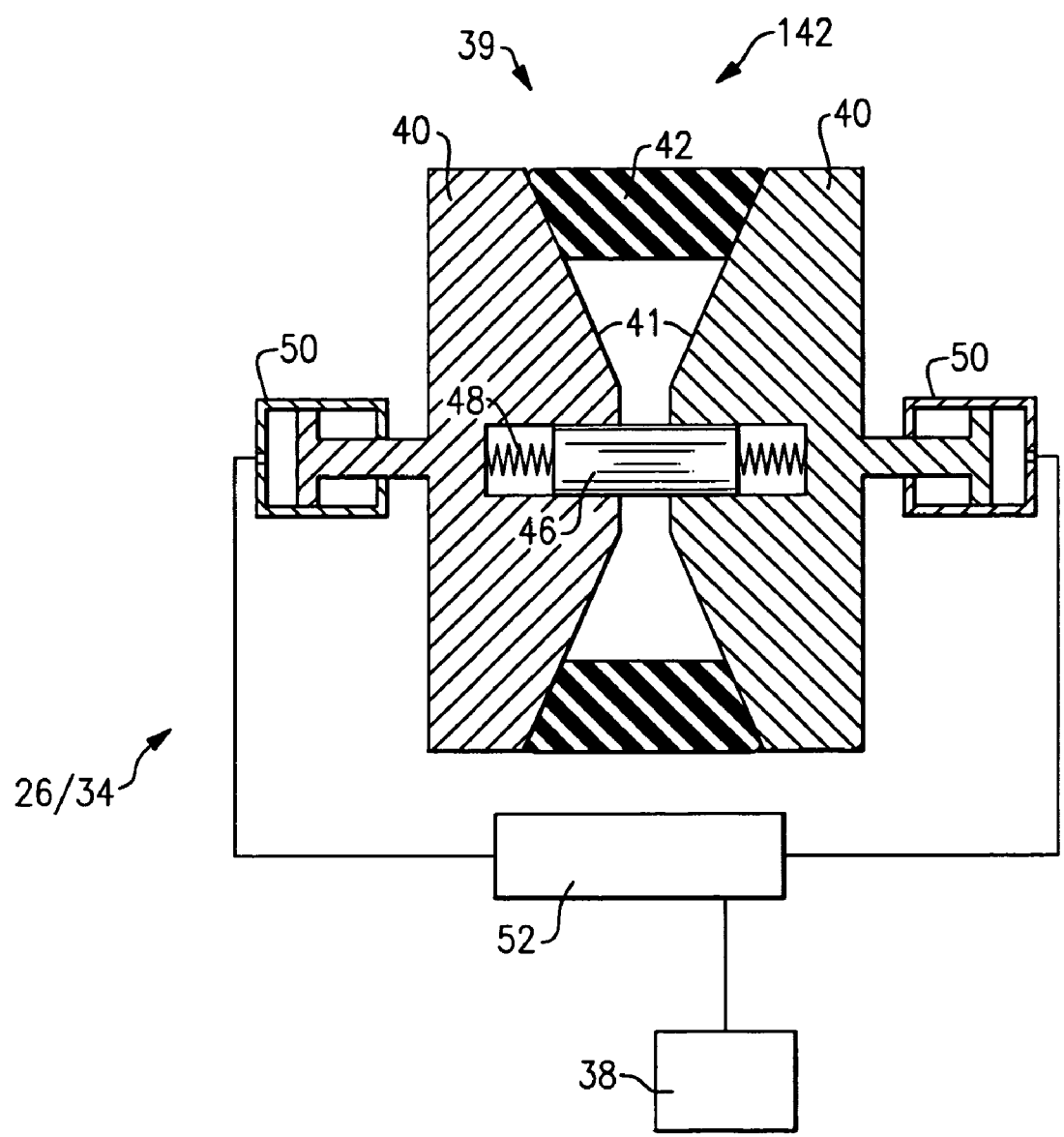
FIG. 2 is a view of an adjustable pulley according to the present invention.

As shown in FIG. 2A, the drive 36 may include an automated adjustable pulley 39 having two opposed plates 40, typically of a conical shape. As shown, plates 40 have internal conical surfaces 41 that together provide a contact surface for a pulley belt 42. The pulley belt 42 is driven by another pulley connected to a motor, as explained below, and in turn drives the plates 40 to rotate fan 26 or 34. Analogously, an adjustable pulley can be located on drive side connected to a motor.

Figure 2B:
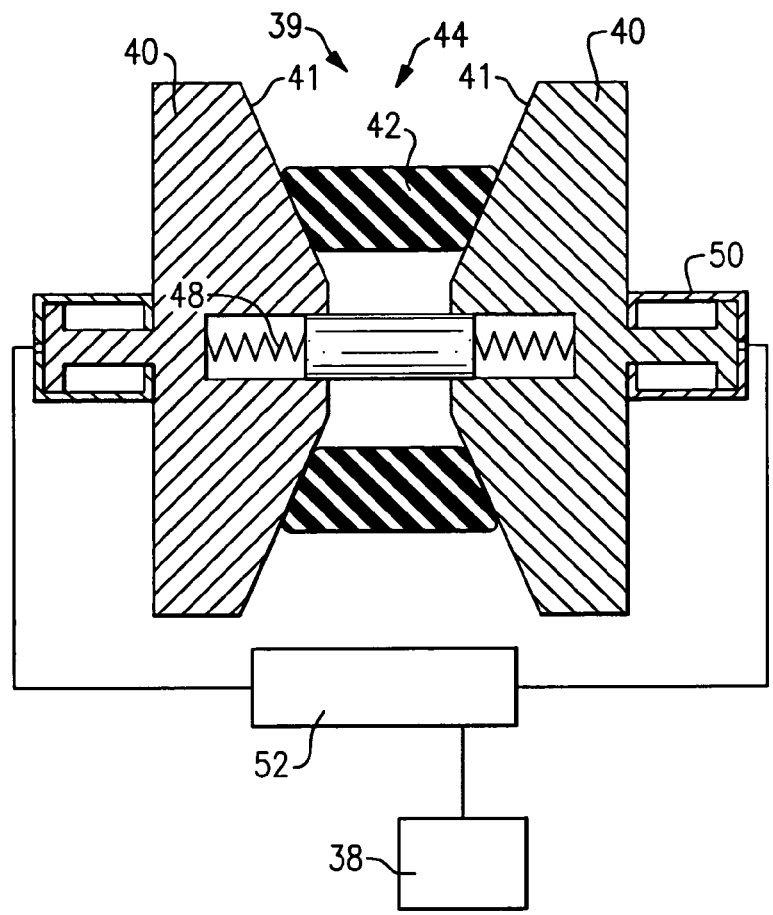
Figure 2C:
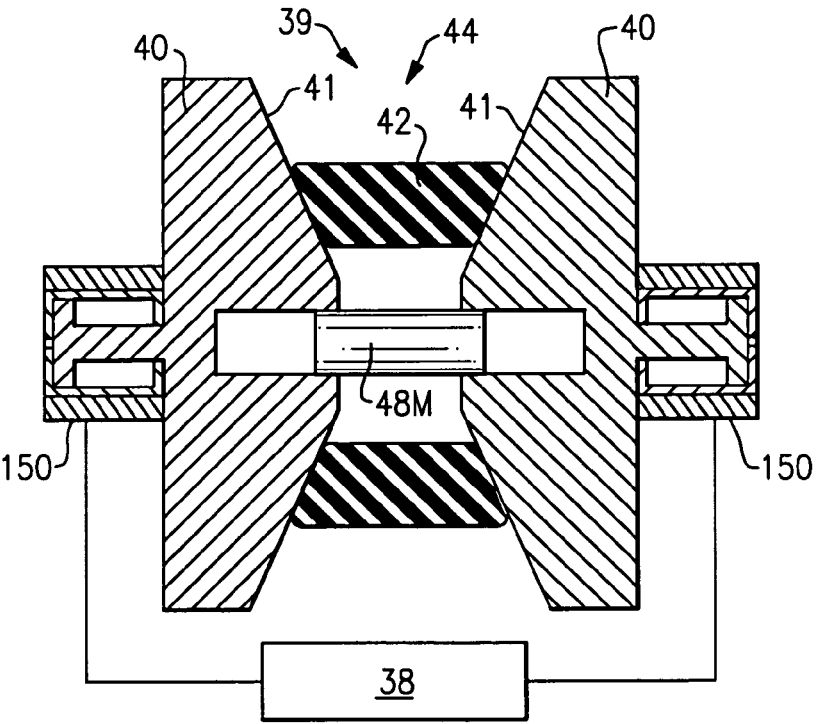

A center core 46 carries springs 48 that bias the plates 40 away from each other. Chambers 50 selectively receive hydraulic fluid from a pump and reservoir 52 to force the plates 40 back toward each other. A control 38 controls the flow of hydraulic fluid to the cambers 50 that in turn controls the position of the plates. By adjusting the position of the plates toward and away from each other, and as is clearly shown between FIGS. 2A and 2B, the pulley belt may move between an outer position 142 (FIG. 2A), and toward an inner position 44 (FIG. 2B). At the inner position 44, the fan will be operated at a lower speed than when the pulley belt is at its outer position 142. Thus, by controlling the position of the plates 40, the control 38 can achieve variable fan speeds. Obviously enough, the spring force and the hydraulic force acting on the pulley plates 40 may reverse directions (and still oppose each other), such that the hydraulic force is pushing pulley plates 40 away from each other and the spring force pulls them together. Further, as shown in FIG. 2C, the mechanical spring 48 can be replaced by a permanent magnet 48M and hydraulic system 50-52 can be replaced by an electro-magnetic system 150, providing identical operational functionality. As an example, electro-magnetic coils 150 can be energized or de-energized to move the plates 40 closer or away from each other. Moreover, if the adjustable pulley were located on a drive (motor) end then the inner position 44 would be associated with a higher fan speed than the outer position 142.

Figure 3A:
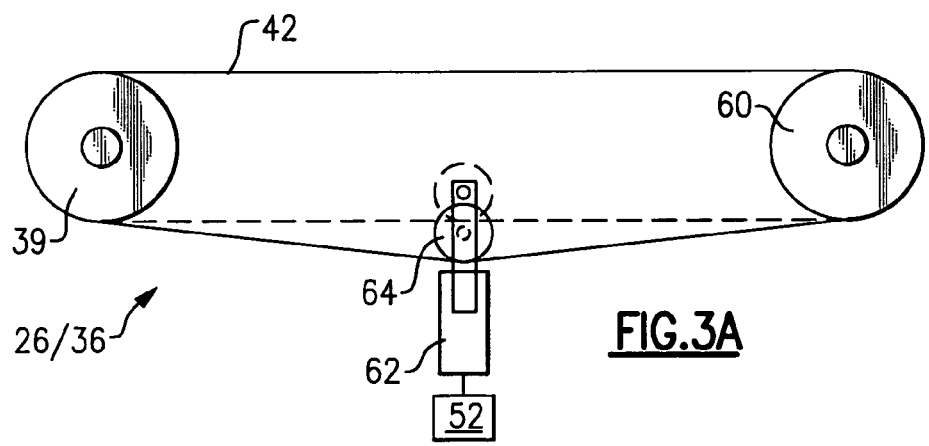
FIG. 3A shows another feature of the present invention.
Figure 3B:
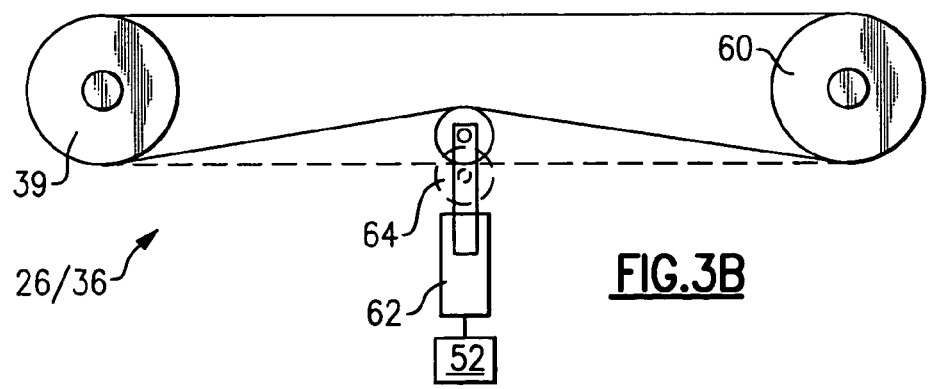
FIG. 3B shows another optional embodiment.

FIGS. 3A and 3B show that an electric motor drives a first pulley 60, which drives the second pulley 39 through the belt 42. An adjustable tension member 62 includes a wheel 64 that is adjustable to ensure that tension remains adequate for proper operation of the belt 42 as the belt moves between the positions 142 and 44. It should be understood that an infinite number of positions can be achieved for the belt 42, and thus an infinite number of speeds can be provided. The adjustable tension member may be also driven by the pump and reservoir 52. Obviously, other known belt tension mechanisms (such as an adjustable screw type mechanism, for instance) can be utilized as well.

The adjustment for the pulley 39 is shown schematically in this application. However, automated pulley drive systems are well known. A worker of ordinary skill in the art, given the teachings of this application, would be able to provide a suitable drive system.

Also, while FIG. 1 shows the flow of refrigerant from compressor 22 to the outdoor heat exchanger 24 operating as a condenser, this application would also extend to flow in the opposite direction, at which the indoor heat exchanger 32 is operating as a condenser to heat air delivered by fan 34 into an environment to be conditioned.

A control 18 for the refrigerant system 20 determines a desired fan speed, and adjusts the position of the plates to achieve that desired fan speed. A worker of ordinary skill in the art would recognize when and how a desired fan speed change would be determined.

As shown in FIG. 1, appropriately positioned pressure transducers P or temperature sensors T can provide feedback on the conditions in the indoor and outdoor environment and operating parameters within the refrigerant system 20. Any of these characteristics or a combination of them can be utilized to determine a desired fan speed. Again, a worker of ordinary skill in the art would recognize what a desired fan speed would be. The present invention is directed to provide a cost-effective way for a variable speed fan functionality to satisfy a wide spectrum of applications and operating conditions as well as ensure safe and reliable refrigerant system operation.

It is understood that the present invention may equally benefit belt-driven applications outside of the air conditioning, heating, ventilation and refrigeration field. Also, it is understood that although the present invention was explained in relation to the fans blowing air across the heat exchangers, it can be equally applied to belt-driven pumps utilized in chiller applications for pumping secondary loop liquid through these heat exchangers. Further, the present invention can be used with an open drive belt-driven compressors.

A worker of ordinary skill in the art would understand that various modifications of the disclosed embodiment would come within the scope of this invention. For that reason, the following claims should be studied to determine the true scope and content of this invention.

What is claimed is:

1. A refrigerant system comprising:
    a compressor for compressing refrigerant, said compressor delivering refrigerant downstream to a condenser, refrigerant passing from said condenser downstream to an expansion device, and downstream of said expansion device to an evaporator, said refrigerant being returned to said compressor from said evaporator, at least one fluid-moving device for moving fluid across at least one of said condenser and said evaporator, said fluid-moving device including an automated mechanical drive mechanism, with said automated mechanical drive mechanism being operable to vary a drive speed of said at least one fluid-moving device and a control for determining a desired drive speed for said at least one fluid-moving device and controlling said automated mechanical drive mechanism to achieve said desired drive speed; and
    said refrigerant system being provided with at least one of an unloader, and an economizer circuit, and the drive speed of at least one fluid-moving device being controlled based upon whether said at least one of said unloader and said economizer circuit are operational.

2. The refrigerant system as set forth in claim 1, wherein said automated mechanical drive mechanism includes a belt being driven on a drive pulley to drive a driven pulley, and at least one of said drive and driven pulleys having a variable diameter to adjust said drive speed of said fluid-moving device, said control changing said variable diameter to adjust said drive speed.

3. The refrigerant system as set forth in claim 2, wherein a spring bias forces plates of said at least one pulley in one direction, and a variable force resists said spring bias to force said plates in an opposed direction, with the resultant position of said plates defining an effective contact diameter between said belt and said plates to vary said drive speed of said fluid-moving device.

4. The refrigerant system as set forth in claim 3, wherein said bias force is created by a permanent magnet.

5. The refrigerant system as set forth in claim 3, wherein said variable force is created by an electro-magnetic drive.

6. The refrigerant system as set forth in claim 2, wherein a belt tension device is adjustable to ensure an adequate tension in said pulley belt as the diameter of said at least one pulley is varied to change the speed of said fluid-moving device.

7. The refrigerant system as set forth in claim 6, wherein said belt tension device is driven by a common drive with said automated mechanical drive mechanism.

8. The refrigerant system as set forth in claim 1, wherein a fluid-moving device for said evaporator is provided with said automated mechanical drive mechanism.

9. The refrigerant system as set forth in claim 1, wherein a fluid-moving device for said condenser is provided with said automated mechanical drive mechanism.

10. The refrigerant system as set forth in claim 1, wherein an economizer circuit is positioned intermediate said condenser and said main expansion device, said economizer circuit including a tap for tapping refrigerant from a main flow line and passing said tapped refrigerant through an economizer expansion device, and then back to an intermediate compression point in said compressor, and said control changing said drive speed of said air moving device dependent upon whether said economizer cycle is being activated or is not being activated.

11. The refrigerant system as set forth in claim 10, wherein said compressor is provided with an unloader.

12. The refrigerant system as set forth in claim 11, wherein said unloader is a valve that is selectively opened to bypass at least a portion of at least partially compressed refrigerant back to suction, and said control varying said drive speed of said fluid-moving device dependent upon whether said valve is opened or closed.

13. The refrigerant system as set forth in claim 1, wherein said compressor is provided with an unloader.

14. The refrigerant system as set forth in claim 13, wherein said unloader is a valve that is selectively opened to bypass at least a portion of at least partially compressed refrigerant back to suction, and said control varying said drive speed of said fluid-moving device dependent upon whether said valve is opened or closed.

15. The refrigerant system as set forth in claim 1, wherein the control determines a desired drive speed based upon at least one system operating parameter.

16. The refrigerant system as set forth in claim 15, wherein said at least one system operating parameter is selected from a group consisting of pressure, temperature and motor current.

17. The refrigerant system as set forth in claim 1, wherein the control determines said desired drive speed based upon ambient temperature.

18. The refrigerant system as set forth in claim 1, wherein said fluid-moving device is a pump moving a fluid.

19. The refrigerant system as set forth in claim 1, wherein said compressor is provided with an automated mechanical drive mechanism.

* * * * *